United States Patent [19]
Dale

[11] 3,730,242
[45] May 1, 1973

[54] ONE-BOLT MOUNT

[76] Inventor: Warren R. Dale, Wever, Iowa 52658

[22] Filed: Dec. 13, 1971

[21] Appl. No.: 207,062

[52] U.S. Cl. .............................. 151/41.7, 248/68 R
[51] Int. Cl. ........................ F16b 39/00, F16l 3/22
[58] Field of Search ...................... 151/41.7, 41.76, 151/68; 248/68, 56, 70, 216; 211/87, 60 R, 60 T; 85/1 H; 138/112, 113

[56] References Cited

UNITED STATES PATENTS

| 1,659,404 | 2/1928 | Lipschutz | 151/41.7 X |
| 2,567,463 | 9/1951 | Atkinson | 248/68 R |

FOREIGN PATENTS OR APPLICATIONS

| 1,134,182 | 11/1956 | France | 248/68 R |
| 964,061 | 7/1964 | Great Britain | 151/68 |

Primary Examiner—Ramon S. Britts

[57] ABSTRACT

A plumbing accessory for mounting ells or the like to a wall in the form of a metal strip having a center hole receiving an anchoring fastener and having pairs of additional holes providing adjustable mounting means for the ells or the like.

1 Claim, 5 Drawing Figures

Patented May 1, 1973

3,730,242

INVENTOR
WARREN R. DALE

ONE-BOLT MOUNT

This invention relates to building construction accessories, more particularly to mounts for plumbing, fittings and the like.

A principal object of the present invention is to provide a metal plate that is formed with a relatively sharp periphery so that the plate does not turn readily when fixed to a wall by one bolt passing through the center of the plate. Holes and slots at a standard, or otherwise suited, spacing are provided for mounting ell and the like.

Another object of the present invention is to provide a device of the type described which is cheap, strong and easy to install.

These and other objects will be readily evident upon a study of the following specification and the accompanying drawing wherein.

Figure 1:
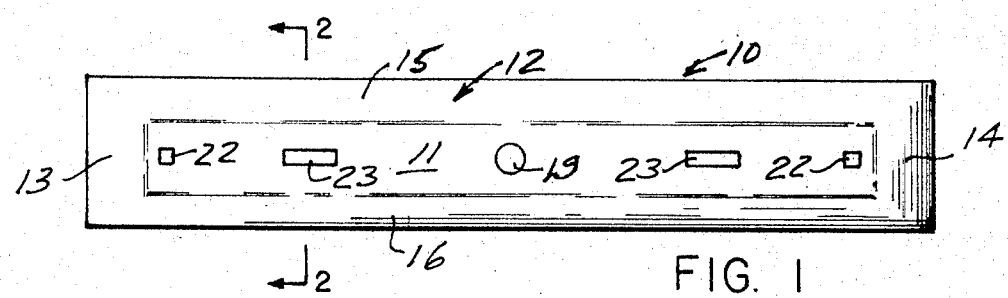
FIG. 1 is a plan view of the mount according to the invention.
Figure 3:
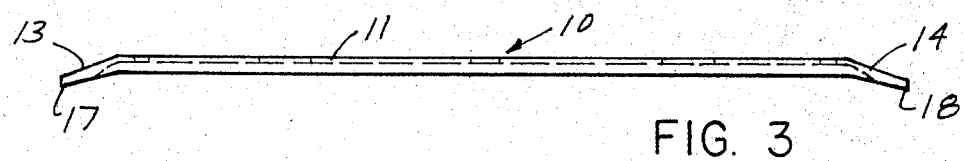
FIG. 3 is an elevation view.
Figure 2:
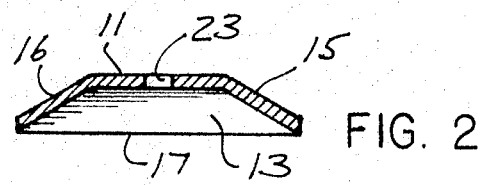
FIG. 2 is a section view taken on line 2—2 of FIG. 1.
Figure 4:
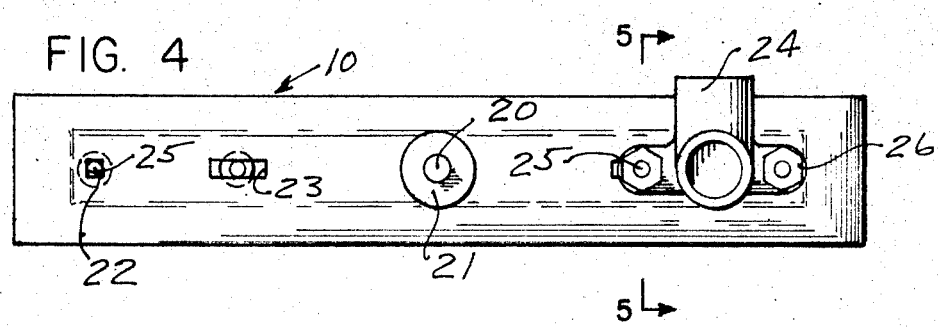
FIG. 4 is a plan view showing mounting hardware and a fitting installed in place.
Figure 5:
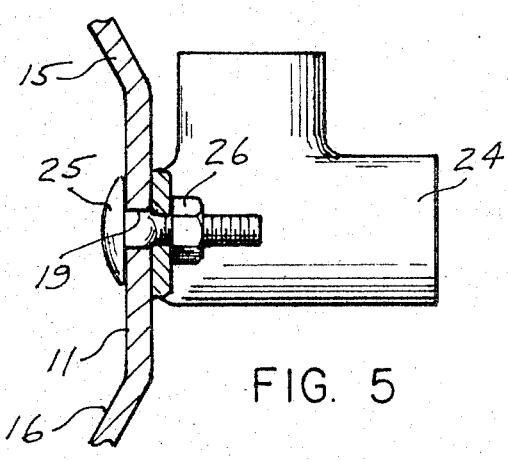
FIG. 5 is an enlarged section view taken on line 5—5 of FIG. 4.

Referring now to the figures the mount 10 is metal stamping in which a central area 11 is maintained flat while the peripheral area 12 is bent down, ends 13 and 14 being bent further than edges 15 and 16. Thus edges 17 and 18 form two lines of sharp contact when mount 10 is placed against a wall. A hole 19 at the center, for a wall bolt 20, is the only wall support. It is then evident that mount 10 cannot turn readily after a nut 21 is tightened on the bolt.

Two pairs of piercings, square holes 22 and rectangular slots 23 are spaced for the mounting of an ell 24, by example, or other fitting. The size of the holes 22 and width of slots 23 agree, and accept carriage bolts 25. Thus nuts 26 may be installed or removed without turning the bolts. This eliminates removal of the mount from the wall for access to ordinary bolts.

What I now claim is:

1. A builder's plumbing accessory in the form of rectangular metal stamping having bent edges, said edges at the ends being bent further then the edges at the sides, said end edges presenting two lines of contact with a plane parallel to said stamping, said stamping having a center hole for mounting to a concrete wall or the like, wherein a bolt is provided extending in the direction in which said edges are bent, and a pair of aligned holes intermediate of said center hole and each of the ends, each pair of holes comprising a square hole having a carriage bolt in fixed position therein and a slotted elongated hole receiving another carriage bolt in adjustable position, said carriage bolts extending in a direction opposite to that of said bolt in said center hole with the heads thereof being captively retained within a recess defined by said bent edges.

* * * * *